(12) United States Patent
Davis et al.

(10) Patent No.: US 6,333,123 B1
(45) Date of Patent: Dec. 25, 2001

(54) HYDROGEN RECOMBINATION CATALYST

(75) Inventors: Stuart M. Davis, Norfolk, MA (US); Peter R. Moses, Windham, NH (US); David L. Pappas, Waltham, MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/605,596

(22) Filed: Jun. 28, 2000

(51) Int. Cl.⁷ .................................................. H01M 10/34
(52) U.S. Cl. ........................... 429/57; 429/206; 429/209; 429/217; 429/219; 429/220; 429/232
(58) Field of Search ..................... 429/209, 217, 429/219, 220, 206, 232

(56) References Cited

U.S. PATENT DOCUMENTS

| | | | |
|---|---|---|---|
| 3,893,870 | 7/1975 | Kozawa | 136/107 |
| 3,896,042 | 7/1975 | Anderson et al. | 252/184 |
| 3,939,006 | 2/1976 | Kozawa | 136/6 GC |
| 3,963,826 | 6/1976 | Anderson et al. | 423/248 |
| 4,552,821 | * 11/1985 | Gibbard et al. | 429/57 |
| 5,340,666 | * 8/1994 | Tomantchger et al. | 429/59 |
| 5,626,988 | * 5/1997 | Daniel-Ivad et al. | 429/229 |
| 6,054,108 | * 4/2000 | Eckardt et al. | 423/580.1 |

OTHER PUBLICATIONS

Kozawa; Hydrogen Gas Absorber Made of $MnO_2$ Catalyzed with Palladium or Platinum Salts, *Denki Kagaku* 46:416–418, 1978.

* cited by examiner

*Primary Examiner*—Carol Chaney
*Assistant Examiner*—Dah-Wei D. Yuan
(74) *Attorney, Agent, or Firm*—Fish & Richardson P.C.

(57) ABSTRACT

An alkaline battery includes a cathode, an anode, a separator, an alkaline electrolyte, and a hydrogen recombination catalyst. The hydrogen recombination catalyst includes a hydrogen oxidizing material, such as CuO, and an activating material. The activating material includes a first activating component and a second activating component. The components of the activating material can be Pd, Pt, Ru metals or salts thereof.

40 Claims, 2 Drawing Sheets

HYDROGEN RECOMBINATION CATALYST

TECHNICAL FIELD

This invention relates to batteries.

BACKGROUND

Batteries, such as primary alkaline batteries, are commonly used as energy sources. Generally, alkaline batteries include a cathode, an anode, a separator, and an electrolytic solution. The cathode can include, for example, manganese dioxide particles as the active material, carbon particles that enhance the conductivity of the cathode, and a binder. The anode may be, for example, a gel including zinc particles as the active material. The separator is disposed between the cathode and the anode. The electrolytic solution can be, for example, a hydroxide solution that is dispersed throughout the battery.

When a battery is used as an electrical energy source in a device, such as a flashlight or a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge. Mercury and other metals such as lead and cadmium often are added to the anode to reduce the levels of hydrogen gas produced during the electrochemical reaction of the battery.

SUMMARY

In general, the invention relates to a hydrogen recombination catalyst for alkaline electrochemical cells. Alkaline electrochemical cells including hydrogen recombination catalysts have reduced hydrogen gassing.

In one aspect, the invention features an alkaline battery including a cathode, an anode, a separator, an alkaline electrolyte, and a hydrogen recombination catalyst. The hydrogen recombination catalyst includes a hydrogen oxidizing material, such as CuO, and an activating material. The activating material includes a first activating component and a second activating component. The components of the activating material can be Pd, Pt, Ru metals or salts thereof.

In another aspect, the invention features a hydrogen recombination catalyst including a hydrogen oxidizing material and an activating material including a first activating component and a second activating component. The hydrogen recombination catalyst can include a Pd, Pt, Ru metal or a salt thereof as the activating material and CuO as the hydrogen oxidizing material.

The hydrogen recombination catalyst preferably oxidizes hydrogen at a rate at least about 0.5 standard cubic centimeter (scc) per gram of hydrogen recombination catalyst per day. The hydrogen recombination catalyst preferably can oxidize hydrogen at this rate for at least 130 days. More preferably, the hydrogen recombination catalyst preferably can oxidize hydrogen at this rate for at least 240 days.

Embodiments of the invention may have one or more of the following advantages. The hydrogen recombination catalyst including a first activating material component and a second activating material component oxidizes hydrogen at a rate equal to the $H_2$ oxidation rate produced by a hydrogen recombination catalyst including only one activating material component but at reduced cost.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
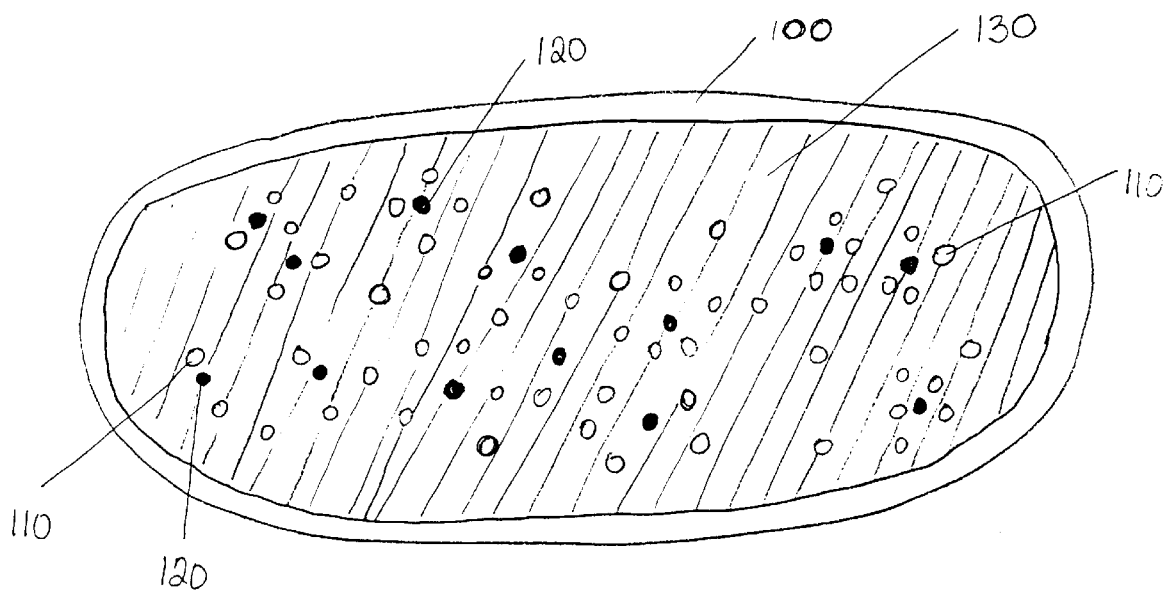
FIG. 1 depicts a cross-sectional view of a hydrogen recombination catalyst.

Referring to FIG. 1, an example of a hydrogen recombination catalyst 6 includes a membrane 100, a hydrogen oxidizing material 110, an activating catalyst 120, and a binder 130. Hydrogen oxidizing material 110 and an activating catalyst 120 are dispersed in binder 130 and encapsulated by membrane 100.

The hydrogen oxidizing material in combination with the activating catalyst absorbs hydrogen gas ($H_2$), produced within an alkaline electrochemical cell (FIG. 2), preferably, by oxidizing $H_2$ to water ($H_2O$). The hydrogen oxidizing material oxidizes $H_2$ and the activating catalyst lowers the energy of activation of the oxidation process between the hydrogen oxidizing material and $H_2$ to increase the rate at which the oxidation occurs.

At normal temperatures and pressures, $H_2O$ exists as a low vapor pressure liquid, whereas $H_2$ exists as a gas. The occupation volume necessary to contain $H_2$ gas in a battery is reduced when the hydrogen recombination catalyst oxidizes $H_2$ to $H_2O$. For instance, a 1,000 cc occupation volume of $H_2$, when oxidized, is converted into about 0.8 cc occupation volume of liquid $H_2O$. As a result, the hydrogen recombination catalyst can reduce the occupation volume for $H_2$ gas in a battery by, for example, about a factor of 1,000.

The hydrogen recombination catalyst preferably oxidizes hydrogen at a rate at least about 0.1 scc, and more preferably 0.5 scc, per gram of hydrogen recombination catalyst per day. The hydrogen recombination catalyst preferably oxidizes hydrogen at a rate of about 0.5 scc per gram of hydrogen recombination catalyst for at least 130 days. More preferably, the hydrogen recombination catalyst oxidizes hydrogen at a rate of about 0.5 scc per gram of hydrogen recombination catalyst for at least 240 days.

Examples of hydrogen oxidizing materials include, but are not limited to, $MnO_2$, $Mn_2O_3$, $MnOOH$, $Mn_3O_4$, $CuO$, $BaO2$, $Ag_2O$, $AgO$, $HgO$, $KMnO_4$, manganese phosphate, bismuth trioxide, m-dinitrobenzene, quinone, and $AgMnO_4$.

The activating catalyst includes a first component and a second component each selected from Group VIII metals, alloys, oxides or salts. Examples of activating catalyst components include, but are not limited to, Pt, Pd, or Ru metals, oxides, salts, or mixtures thereof.

The hydrogen recombination catalyst may include, for example, between about 75 to about 85 weight percent of a hydrogen oxidizing material, about 0.05 to about 6 weight percent activating catalyst, between about 10 to about 20 weight percent of a binder, and between about 1 to about 5 weight percent of an encapsulation material. Preferably, the hydrogen recombination catalyst includes between about 0.5 to about 2 weight percent activating catalyst and between about 80 to about 85 weight percent of the hydrogen oxidizing material. More preferably, the hydrogen recombination catalyst includes between about 0.05 to about 0.2 weight percent of a first activating catalyst component, such as Pt or Pd metal, oxide, or a salt thereof, and between about 0.2 to about 1.8 weight percent of a second activating catalyst component, such as Ru metal, oxide, or a salt thereof Suitable binder materials are permeable to hydrogen, oxygen, and water vapor. The binder also increases the active surface area of the hydrogen oxidizing material and the activating catalyst relative to a powder, non-dispersed form of the hydrogen oxidizing material and the activating catalyst. In powder form, the hydrogen oxidizing material and the activating catalyst often form clumps or small masses which inhibit the long-term hydrogen oxidation, i.e., the oxidation rate of $H_2$ after the outer surface of the mass is fully reduced. Examples of binder materials include inorganic cements or organic polymers. Examples of inorganic cements include Portland Cement and Plaster of Paris. Examples of organic polymers include silicone, polyisobutylene and EP rubber silicone polymer, such as GE type II silicone rubber are available from GE, located in Waterford, N.Y.

The preferred material which encapsulates the hydrogen recombination catalyst is permeable to $H_2$, $O_2$, and $H_2O$ vapor, but impermeable to other internal components of metal-air batteries, such as KOH present in the battery electrolyte, which may react with or dissolve and thereby inhibit the reactivity of the hydrogen recombination catalyst. The membrane preferably also prohibits contamination of the metal-air battery, such as the anode, by the hydrogen oxidizing material and the activating catalyst. Suitable membrane materials include polyolefins, such as polyethylene, plastics, rubbers, elastomers, fluoroelastomers and paraffin wax. Other membrane materials include polypropylene, polypropylene/polypropylene copolymers and blends, polybutylene, and blends of waxes with polyolefins. The thickness of the encapsulating membrane is adjusted to provide structural support for the catalyst and to prevent harmful internal components of the metal-air battery from entering the catalyst. The encapsulating membrane is folded over the binder containing the hydrogen oxidizing material and the activating catalyst and the open edges are heat-sealed.

Figure 2:
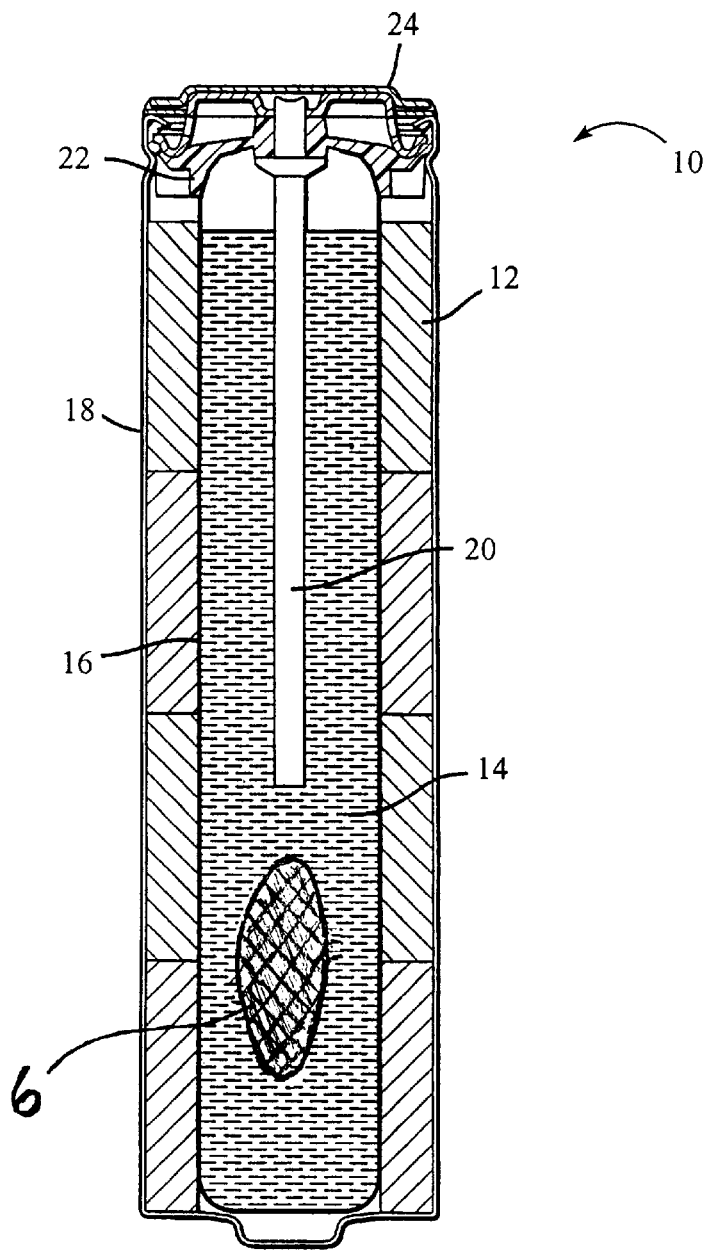
FIG. 2 depicts a cross-sectional view of an alkaline electrochemical cell.

Referring to FIG. 2, a battery 10 (e.g., an alkaline electrochemical cell) includes a cathode 12, an anode 14, a hydrogen recombination catalyst 6, a separator 16, and a cylindrical housing 18. Battery 10 also includes current collector 20, seal 22, and a negative metal top cap 24, which serves as the negative terminal for the battery. The cathode is in contact with the housing, and the positive terminal of the battery is at the opposite end of the battery from the negative terminal. An electrolytic solution is dispersed throughout battery 10. Battery 10 can be, for example, an AA, AAA, AAAA, C, or D battery.

Cathode 12 includes manganese dioxide, a blend including both non-expanded graphite particles and expanded graphite particles, and a cathode binder.

Any of the conventional forms of manganese dioxide used for cathodes can be used. For example, the manganese dioxide can be EMD or CMD. Distributors of manganese dioxides include Kerr McGee, Co. (Trona D), Chem Metals, Co., Tosoh, Delta Manganese, Mitsui Chemicals and JMC. Generally the cathode may include, for example, between 80% and 88%, and preferably between 86% and 88%, of manganese dioxide by weight.

The carbon particles are a blend of non-expanded graphite particles and expanded graphite particles. The graphite can be synthetic or non-synthetic, or a blend of synthetic and non-synthetic. The non-expanded graphite particles prefer-ably have an average particle size of less than about 20 microns, more preferably from about 2 microns to about 12 microns, and most preferably from about 5 microns to about 9 microns. Non-synthetic, non-expanded graphite particles can be obtained from, for example, Brazilian Nacional de Grafite (Itapecerica, MG Brazil (MP-0702X). The expanded graphite particles preferably have an average particle size of less than 40 microns, more preferably between 18 microns and 30 microns, and most preferably between 24 microns and 28 microns. Expanded graphite particles may be purchased, for example, from Chuetsu Graphite Works, Ltd. (Chuetsu grades WH-20A and WH-20AF) of Japan.

The cathode may include for example, between 3% and 7%, preferably between 4% and 6.5% carbon particles by weight. Generally, between 25% and 75%, or 35% and 65%, or 40% and 60%, or 45% and 55% of the carbon particles are non-expanded graphite particles, with the remainder being the expanded graphite particles.

Examples of cathode binders include polyethylene powders, polyacrylamides, Portland cement and fluorocarbon resins, such as PVDF and PTFE. An example of polyethylene binder is sold under the tradename Coathylene HA-1681 (available from Hoescht). The cathode may include, for example, between 0.1 percent to about 1 percent of the cathode binder by weight.

Cathode 12 can include other additives. Examples of these additives are disclosed, for example, in U.S. Pat. No. 5,342,712, which is hereby incorporated by reference. Cathode 12 may include, for example, from about 0.2 weight percent to about 2 percent $TiO_2$ weight.

The electrolyte solution also is dispersed through cathode 12, and the weight percentages provided above and below are determined after the electrolyte solution has been dispersed.

Anode 14 can be formed of any of the standard zinc materials used in battery anodes. For example, anode 14 can be a zinc slurry that includes zinc metal particles, a gelling agent, and minor amounts of additives, such as gassing inhibitor. In addition, a portion of the electrolyte solution is dispersed throughout the anode.

The zinc particles can be any of the zinc particles conventionally used in slurry anodes. Examples of zinc particles include those described in U.S. Ser. No. 08/905,254, U.S. Ser. No. 09/115,867, and U.S. Ser. No. 09/156,915, which are assigned to the assignee in the present application and are hereby incorporated by reference. The anode may include, for example, between 67% and 71% of zinc particles by weight.

Examples of gelling agents include polyacrylic acids, grafted starch materials, salts of polyacrylic acids, polyacrylates, carboxymethylcellulose, sodium carboxymethylcellulose or combinations thereof. Examples of such polyacrylic acids are Carbopol 940 and 934 (available from B. F. Goodrich) and Polygel 4P (available from 3V), and an example of a grafted starch material is Waterlock A221 (available from Grain Processing Corporation, Muscatine, Iowa). An example of a salt of a polyacrylic acid is Alcosorb G1 (available from Ciba Specialties). The anode may include, for example, from 0.1 percent to about 2 percent gelling agent by weight.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for battery separators. In some embodiments, separator 16 can be formed of two layers of non-woven, non-membrane material with one layer being disposed along a surface of the other. To minimize the volume of separator 16 while providing an efficient battery, each layer of non-woven, non-membrane material an have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Generally, the layers can be substantially devoid of fillers, such as inorganic particles.

In other embodiments, separator 16 includes a layer of cellophane combined with a layer of non-woven material. The separator also includes an additional layer of non-woven material. The cellophane layer can be adjacent cathode 12 or the anode. Preferably, the non-woven material contains from about 78 weight percent to about 82 weight percent PVA and from about 18 weight percent to about 22 weight percent rayon with a trace of surfactant. Such non-woven materials are available from PDM under the tradename PA25.

The electrolytic solution dispersed throughout battery 10 can be any of the conventional electrolytic solutions used in batteries. Typically, the electrolytic solution is an aqueous hydroxide solution. Such aqueous hydroxide solutions include potassium hydroxide solutions including, for example, between 33% and 38% by weight percent potassium hydroxide, and sodium hydroxide solutions.

Housing 18 can be any conventional housing commonly used in primary alkaline batteries. The housing typically includes an inner metal wall and an outer electrically non-conductive material such as heat shrinkable plastic. Optionally, a layer of conductive material can be disposed between the inner wall and the cathode 12. This layer may be disposed along the inner surface wall, along the circumference of cathode 12 or both. This conductive layer can be formed, for example, of a carbonaceous material. Such materials include LB100 (Timcal), Eccocoat 257 (W. R. Grace & Co.), Electrodag 109 (Acheson Colloids Company), Electrodag 112 (Acheson) and EB0005 (Acheson). Methods of applying the conductive layer are disclosed in, for example, Canadian Patent No. 1,263,697, which is hereby incorporated by reference.

Current collector 28 is made from a suitable metal, such as brass. Seal 30 can be made, for example, of nylon.

During operation, residual $H_2$ gas produced at the anode permeates the encapsulating member of the hydrogen recombination catalyst, diffuses through the binder, and is oxidized by the hydrogen oxidizing material and the activating catalyst. Without wishing to be bound by any particular theory, it is believed that the activating catalyst homolytically cleaves the $H_2$ gas into two hydrogen atoms. Each hydrogen atom, in turn, contacts and reduces the hydrogen oxidizing material to form a bond with an oxygen atom and thereby complete the oxidation of $H_2$ into $H_2O$. $H_2O$ produced by the hydrogen recombination catalyst can be reused, for example, in the electrolyte of the battery.

Although shown in FIG. 2 as being located in the anode side of the alkaline battery, the hydrogen recombination catalyst can be located anywhere within the battery. Preferably, the hydrogen recombination catalyst is located in the anode portion of the battery.

In addition, the hydrogen recombination catalyst can be constructed without the binder, i.e., the $H_2$, $O_2$, and $H_2O$ vapor permeable membrane encapsulates a mixture of the hydrogen oxidizing material and the activating catalyst. Alternatively, the hydrogen oxidizing material and the activating catalyst can be alloyed together into a plurality of individual alloyed particles each of which can be encapsulated by the permeable membrane. The coated alloyed particles can be dispersed within the battery, such as in the anode gel on the surface of the can. Suitable methods for encapsulating individual alloy particles include spray-coating the membrane onto the particles, precipitation/reaction coating, vapor phase deposition with or without subsequent heat treatment.

EXAMPLES

Example 1

An example of hydrogen recombination catalyst 6 was prepared according to the following procedure. An agate motor was charged with about 98.9 weight percent CuO, about 0.1 weight percent PtC12, about 1 weight percent RuC13, and enough distilled water to create a thick paste. The resulting mixture was ground and dried in an oven at 71° C. The dried mixture was further ground to produce a lump-free powder. About 2.5 g of the resulting powder was blended with about 0.4 g of GE type II silicone rubber and 30 drops of mineral spirits (to reduce viscosity). The resulting blend was equally divided into ten parts. Each part was separately deposited on a 2.7 mil polyethylene film and cured in an oven at 55° C. for about 3.5 hours. A small section of the sheet was folded over the cured material and heat sealed on an impulse sealer to create a polyethylene envelope. Excess polyethylene was trimmed away from the envelope and each of the ten envelopes were weighed. The hydrogen recombination catalysts were cleaned and the polyethylene envelope seal was checked for leaks by immersing the catalysts into 1:1 concentrated $HCL:H_2O$. The envelopes were approximately 1 cm×1 cm×0.5 cm.

The rate of hydrogen absorption of the hydrogen recombination catalyst was determined as follows. Each pre-weighed envelope was sealed into a foil bag. The bag was subsequently evacuated and charged with a known amount of hydrogen gas at room temperature. The amount of hydrogen gas absorbed by the catalyst, i.e., the change in the amount of hydrogen in the foil bag, was monitored for 130 days by periodically measuring the buoyancy of the foil bag.

The hydrogen recombination catalysts consumed hydrogen at a rate at least about 0.5 scc per gram of hydrogen recombination catalyst per day for at least 130 days.

Other embodiments are within the claims.

What is claimed is:

1. An alkaline battery, comprising:

a cathode;

an anode;

a separator;

an alkaline electrolyte; and a hydrogen recombination catalyst including a hydrogen oxidizing material and an activating material, wherein the activating material includes a first activating component and a second activating component, and the first and second activating components each are capable of homolytically cleaving hydrogen.

2. The alkaline battery of claim 1, wherein the hydrogen oxidizing material comprises a compound selected from the group consisting of $MnO_2$, $CuO$, $Ag_2O$, $BaO_2$, $AgO$, $KMnO_4$, and $AgMnO_4$.

3. The alkaline battery of claim 1, wherein the hydrogen oxidizing material comprises CuO.

4. The alkaline battery of claim 2, wherein the first component and the second component of the activating material include group VIII metals or salts thereof.

5. The alkaline battery of claim 4, wherein the group VIII metals or salts thereof are selected from the group consisting of Pd, Pt, Ru metals or salts thereof.

6. The alkaline battery of claim 4, wherein the first component of the activating material includes Pt metals or salts and the second component of the activating material includes Ru metals or salts.

7. The alkaline battery of claim 6, wherein the first component of the activating material includes $PtCl_2$ and the second component of the activating material includes $RuCl_3$.

8. The alkaline battery of claim 3, wherein the first component of the activating material includes $PtCl_2$ and the second component of the activating material includes $RuCl_3$.

9. The alkaline battery of claim 1, wherein the hydrogen recombination catalyst is dispersed in a binder.

10. The alkaline battery of claim 9, wherein the binder is a silicone.

11. The alkaline battery of claim 1, wherein the hydrogen recombination catalyst is encapsulated by a hydrogen and water permeable membrane.

12. The alkaline battery of claim 11, wherein the hydrogen recombination catalyst is dispersed in a binder, the binder and the hydrogen recombination catalyst being encapsulated in the hydrogen and water permeable membrane.

13. The alkaline battery of claim 1, wherein the hydrogen recombination catalyst is disposed in an anode side of the metal-air battery.

14. The alkaline battery of claim 1, wherein the hydrogen recombination catalyst comprises between about 75 to about 85 weight percent of CuO.

15. The alkaline battery of claim 14, wherein the hydrogen recombination catalyst further comprises between about 0.05 to about 6 weight percent of the activating material.

16. The alkaline battery of claim 15, wherein the activating material further comprises between about 0.05 to about 0.2 weight percent of the first component and between about 0.2 to about 1.8 weight percent of the second component.

17. An alkaline battery comprising:
  (a) an anode;
  (b) a cathode including a metal that reduces oxygen;
  (c) a separator between the anode and the cathode;
  (d) an alkaline electrolyte; and
  (e) a hydrogen recombination catalyst including a Ru metal or a salt thereof, Pd or Pt metals or salts thereof, and CuO.

18. The alkaline battery of claim 17, wherein the hydrogen recombination catalyst includes a binder.

19. The alkaline battery of claim 17, wherein the hydrogen recombination catalyst is encapsulated by a hydrogen and water permeable membrane.

20. The alkaline battery of claim 17, wherein the hydrogen recombination catalyst comprises between about 75 to about 85 weight percent of CuO.

21. The alkaline battery of claim 17, wherein the hydrogen recombination catalyst comprises between about 0.05 to about 6 weight percent of the Ru, Pd, or Pd metals or salts thereof.

22. The alkaline battery of claim 17, wherein the hydrogen recombination catalyst comprises between about 0.05 to about 0.2 weight percent of the Pd or Pt metals or salts thereof and between about 0.2 to about 1.8 weight percent of the Ru metal or salt thereof.

23. The alkaline battery of claim 22, wherein the hydrogen recombination catalyst comprises between about 80 to about 85 weight percent of CuO.

24. A hydrogen recombination catalyst comprising:
  a hydrogen oxidizing material and an activating material including a first activating component and a second activating component, wherein the first and second activating components each are capable of homolytically cleaving hydrogen.

25. The hydrogen recombination catalyst of claim 24, wherein the hydrogen oxidizing material comprises a compound selected from the group consisting of $MnO_2$, CuO, $Ag_2O$, $BaO_2$, AgO, $KMnO_4$, and $AgMnO_4$.

26. The hydrogen recombination catalyst of claim 24, wherein the hydrogen oxidizing material comprises CuO.

27. The hydrogen recombination catalyst of claim 25, wherein the first component and the second component of the activating material include group VIII metals or salts thereof.

28. The hydrogen recombination catalyst of claim 27, wherein the group VIII metals or salts thereof are selected from the group consisting of Pd, Pt, Ru metals or salts thereof.

29. The hydrogen recombination catalyst of claim 27, wherein the first component of the activating material includes Pt metals or salts and the second component of the activating material includes Ru metals or salts.

30. The hydrogen recombination catalyst of claim 29, wherein the first component of the activating material includes $PtCl_2$ and the second component of the activating material includes $RuCl_3$.

31. The hydrogen recombination catalyst of claim 26, wherein the first component of the activating material includes $PtCl_2$ and the second component of the activating material includes $RuCl_3$.

32. The hydrogen recombination catalyst of claim 24, wherein the hydrogen recombination catalyst is dispersed in a binder.

33. The hydrogen recombination catalyst of claim 24, wherein the hydrogen recombination catalyst is encapsulated by a hydrogen and water permeable membrane.

34. The hydrogen recombination catalyst of claim 24, wherein the hydrogen recombination catalyst comprises between about 75 to about 85 weight percent of CuO.

35. The hydrogen recombination catalyst of claim 33, wherein the hydrogen recombination catalyst further comprises between about 0.05 to about 6 weight percent of the activating material.

36. The hydrogen recombination catalyst of claim 34, wherein the activating material further comprises between about 0.05 to about 0.2 weight percent of the first component and between about 0.2 to about 1.8 weight percent of the second component.

37. An alkaline battery, comprising:
  a cathode;
  an anode;
  a separator;
  an alkaline electrolyte; and
  a hydrogen recombination catalyst including a hydrogen oxidizing material and an activating material, wherein the activating material includes a first activating component and a second activating component, and the hydrogen oxidizing material comprises CuO.

38. An alkaline battery, comprising:
  a cathode;
  an anode;

a separator;

an alkaline electrolyte; and a hydrogen recombination catalyst including a hydrogen oxidizing material and an activating material, wherein the activating material includes a first activating component and a second activating component, and the hydrogen recombination catalyst is encapsulated by a hydrogen and water permeable membrane.

39. An alkaline battery, comprising:

a cathode;

an anode;

a separator;

an alkaline electrolyte; and a hydrogen recombination catalyst including a hydrogen oxidizing material and an activating material, wherein the activating material includes a first activating component and a second activating component, and the hydrogen recombination catalyst comprises between about 75 to about 85 percent of CuO.

40. A hydrogen recombination catalyst comprising:

a hydrogen oxidizing material and an activating material including a first activating component and a second activating component, wherein the hydrogen recombination catalyst is encapsulated by a hydrogen and water permeable membrane.

\* \* \* \* \*

UNITED STATES PATENT AND TRADEMARK OFFICE
CERTIFICATE OF CORRECTION

PATENT NO. : 6,333,123 B1
DATED : December 25, 2001
INVENTOR(S) : Stuart M. Davis, Peter R. Moses and David L. Pappas It is certified that error appears in the above-identified patent and that said Letters Patent is hereby corrected as shown below:

<u>Title page,</u>
Item [56], U.S. PATENT DOCUMENTS, replace "Tomantchger" with
-- Tomantschger --; and add -- 5,162,169  11/1992  Tomantschger et al.  429/59 --.

Signed and Sealed this

Third Day of December, 2002

JAMES E. ROGAN
*Director of the United States Patent and Trademark Office*